Sept. 19, 1967     L. BALAMUTH     3,341,935
ENERGY STORAGE IN HIGH FREQUENCY VIBRATORY DEVICES
Filed April 23, 1964     3 Sheets-Sheet 3

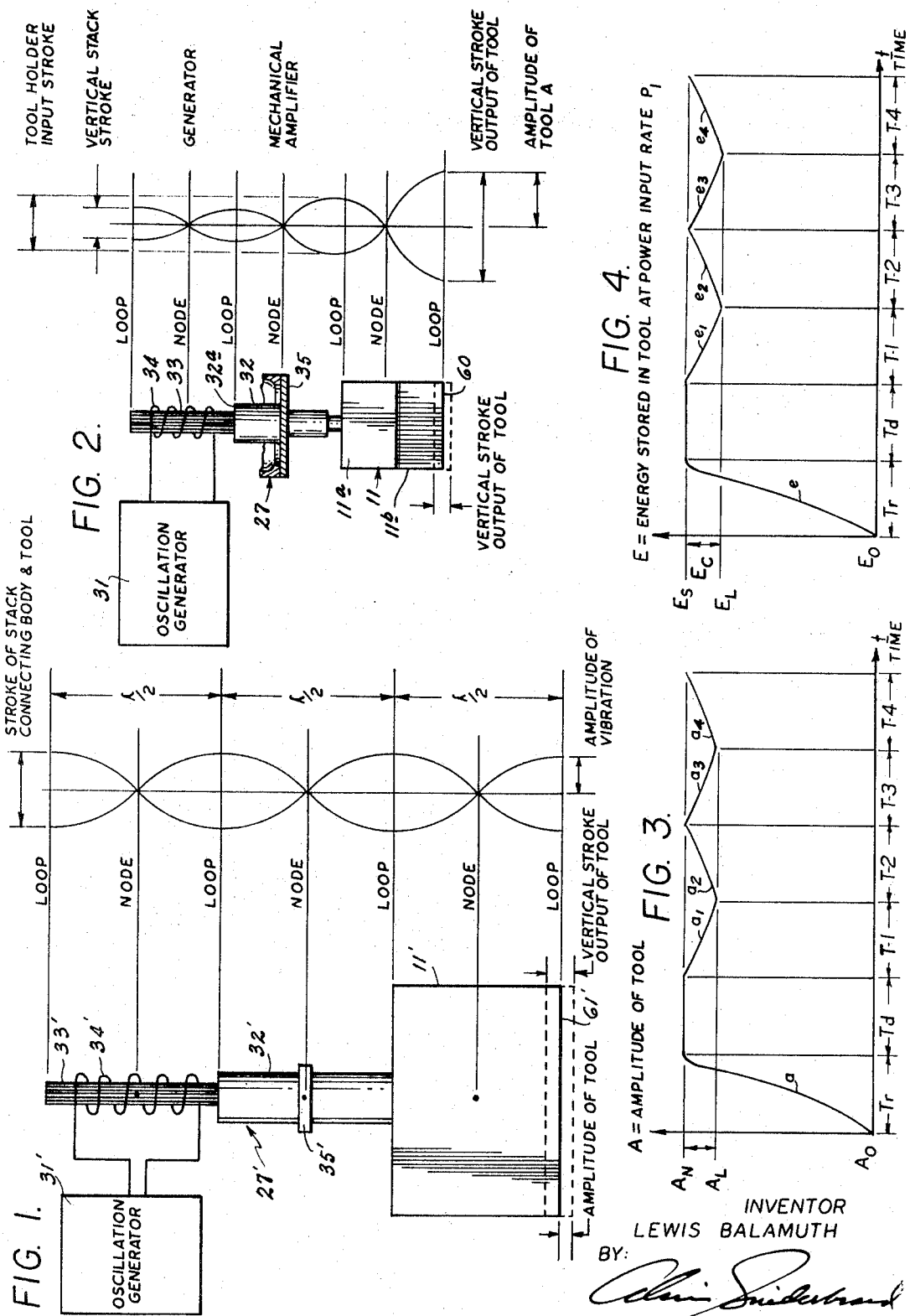

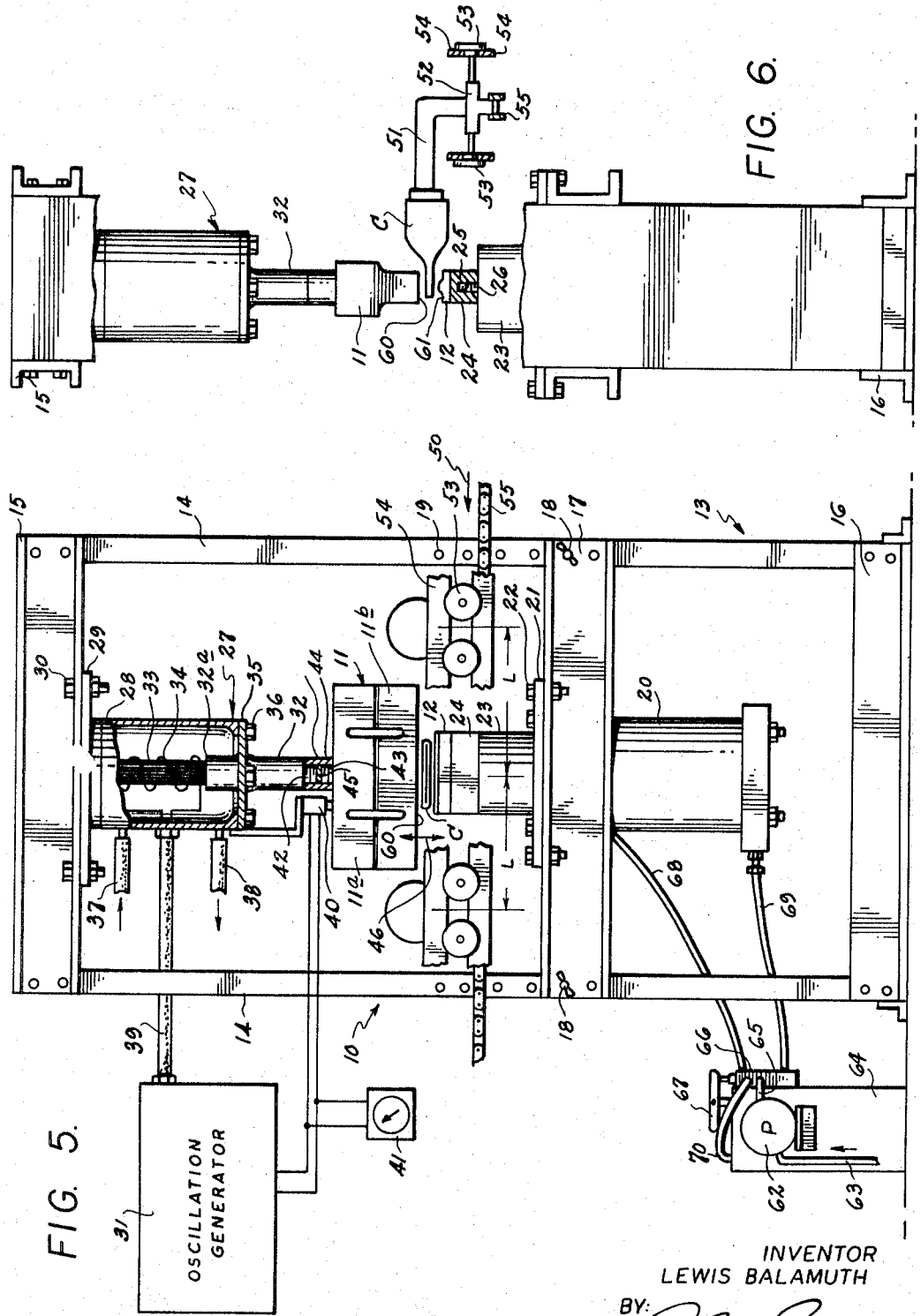

INVENTOR
LEWIS BALAMUTH
BY:
ATTORNEY

United States Patent Office 3,341,935
Patented Sept. 19, 1967

3,341,935
ENERGY STORAGE IN HIGH FREQUENCY
VIBRATORY DEVICES
Lewis Balamuth, New York, N.Y., assignor to Cavitron Ultrasonics Inc., Long Island City, N.Y., a corporation of New York
Filed Apr. 23, 1964, Ser. No. 362,019
13 Claims. (Cl. 29—470)

ABSTRACT OF THE DISCLOSURE

In order to permit mechanical vibratory energy, at a frequency of at least 400 cycles per second, to be applied to a work object during intermittent work periods at a rate greater than that at which such energy is produced continuously by a generator thereof, the vibratory energy is continuously transmitted from the generator through a transmission means, which may be in the form of a tool, to an output surface which is disposed in energy transferring relation to the work object only during each work period, such transmission means having an elastic energy storage capacity many, preferably at least twenty times as large as that of the generator and also many, preferably at least five times as large as the quantity of energy received by the work object during each work period, and the generator supplies the energy at a continuous rate greater than that required to sustain vibration of the transmission means and output surface at such frequency during the intervals between work periods, which intervals are of sufficient duration to permit replenishment of energy stored in the transmission means.

---

This invention relates generally to the use of high frequency, for example, one thousand cycles per second or more, or even ultrasonic vibrations, in performing various operations, for example, in the machining, forging, dimpling and forming of metals in the welding of plastics or metals and in cleaning, to mention but a few of the present applications of high frequency vibration, and it is particularly directed to reducing the power requirements for vibrating the work tool used in all of the above mentioned applications.

This invention may be usefully applied to the above mentioned operations and more particularly is applicable to those operations where it is desirable and advantageous that the vibratory energy be intermittently transferred into the work piece. A number of the applications of high frequency vibrations which have been proposed and practiced have been handicapped, although technically feasible, by the relatively high cost of the vibratory apparatus or motor and more particularly by the cost of the generator for energizing the same. For example, although there has been a growing use of sonic and ultrasonic energy for forging, forming and dimpling operations, and the results to date clearly indicate that it is possible to replace motor working systems having massive structures with the strength necessary to provide the large static loads normally required in these processes, with relatively smaller structures when using vibratory systems, these vibratory systems, while small when compared to conventional forging systems, are still relatively large in the field of ultrasonic technology. Accordingly, it is an object of this invention to retain the various beneficial effects by the utilization of vibratory energy, but at a reduced power input level into the system and, in turn, at a reduced cost to the user.

In the applications of sonic or ultrasonic vibrations described above and as currently practiced, a tool is vibrated at sonic or ultrasonic frequencies and its end or output surface is pressed against the work piece or placed in close proximity to the work piece to permit a transfer of energy to the latter. The devices or motors used to power a selected work tool essentially comprise a vibrator having an electromechanical part or section which is induced to vibrate at relatively high frequency and small amplitude by the feeding thereto of an energizing current from a suitable source, for example, an alternating current generator. The electromechanical section or part may be any one of several types such as electrodynamic, piezo-electric, or magnetostrictive, for example, with an operating frequency range in the order of 1,000 to 40,000 cycles per second.

Where the electromechanical section or part is magnetostrictive, it is in the form of a stack surrounded by an energizing coil and having one end fixed to a connecting body whose other end rigidly supports a selected work tool. The connecting body may serve as an acoustic impedance transformer and be so shaped and formed as to either enlarge or reduce the amplitude of the vibrations produced in the magnetostrictive part as delivered to the work tool through the connecting body. The vibrator above described, essentially is composed of an electromechanical part or section, a connecting body and a work tool which are rigidly joined end to end as a unit, and supported by a suitable housing or casing.

When using a vibrator for operations requiring intermittent contact between the work tool and the work piece, I have found it possible to store a sufficient quantity of energy within the work tool and connecting body to permit performance of a selected operation during which a greater quantity of energy is consumed than is being supplied by the generator in the time required for such operation. In the interval of time between work cycles, the energy level in the tool is increased by the storage of that portion of the supplied energy in excess of what is consumed in heat and friction within the work tool and connecting body. By this new and novel principle, I have found that, for certain operations in which an intermittent transfer of energy is required, the power required may be as little as one tenth of what was required before.

The theory of the invention may be more easily understood by considering the working tool and connecting body of the vibratory assembly as analogous to the flywheel associated with a conventional electric motor. When a fly-wheel is rotating at a given speed and is of a specified mass, it has a stored energy level capable of doing a certain amount of work. If the power source is disconnected and the fly-wheel is permitted to continue running, it will eventually stop due to its own internal energy losses resulting from friction. But, if energy is continuously supplied at a rate equal to that at which energy is dissipated by friction, the stored energy can be maintained at its original level. Therefore, when dealing with fly-wheels having a relatively large mass, it is possible, with a minimum introduction of energy, to maintain the fly-wheel at a given speed, even though the fly-wheel is used, with an accompanying die, to perform a forming, forging or dimpling operation. In such an arrangement, even if no further energy is introduced, a series of blows may be inflicted prior to the consumption of all the stored energy by friction, and by the die and work piece prior to the fly-wheel coming to rest. This type of operation may be classified as being intermittent, in that there is a time interval between blows. An energy input level can be calculated for each system that will, when said energy is fed into the system constantly, maintain the system in equilibrium. By equilibrium is meant that the energy consumed by the work piece and friction per work cycle will be replenished in the interval of time between successive work cycles. Thus, by supplying a comparatively small constant energy input to the system after the latter has initially reached a peak operative speed, it may be maintained at that level, although there are losses during each work cycle. In actuality, the energy is replenished and stored in the fly-wheel at a constant rate, when the work tool is not in contact with the work piece or transmitting energy through some medium rate.

When vibratory motors are used for applications in which the work tool is used on a continuous basis or for substantially long intervals of time, the present invention may not always be applicable. However, there are various applications in which the ultrasonic vibratory apparatus is used on an intermittent basis, and where it is possible to maintain the energy level of the work tool at a point sufficient for performance of the selected operation, for example, welding, sealing, forging, forming, dimpling, and the like, and, within the dwell time between work cycles, to replenish the energy consumed in friction and that transferred into the work piece or object. Prior to this invention, it has been the practice in the ultrasonic art to select a motor size and generator having a specific power output to drive a given work tool. The power required was deemed dependent upon the frequency of vibration, the mass of the work tool, amplitude of vibration it is to be driven at, and the energy requirements of the process as well as internal losses in the system. Once this selection of motor size and power source was made, it has been the practice to use the system for both continuous and intermittent operations.

It is apparent that the cost of the power for a given system is not only the kilowatts per hour charge for electricity, but also the cost of the motor and generator. In various applications of ultrasonic energy, which have been shown to be sound technically, the cost of the motor and generator have made their use prohibitive. One of the advantages of using the methods of this invention is that it is possible to perform ultrasonic operations requiring intermittent contact or transfer of energy from the work tool to the work piece by generators and motors having reduced power outputs.

It is accordingly a general object of the present invention to provide a novel method of maintaining the requisite stored energy within a vibratory assembly at a preselected level particularly suited to various applications.

Another object is to utilize the energy storage capacity of the vibratory tool to store within it sufficient energy to thereby reduce the required power output of the generator.

Another object is to provide a novel method of maintaining the stored energy within the output section of a vibratory assembly when intermittent transfers of energy are required from the output section of the vibratory assembly to a work piece.

Another object of this invention is to provide a method by which the energy level of an acoustical impedance transfer may be maintained at a sufficient stored energy level to permit intermittent transmission of the stored energy to a tool or work member and, in the dwell time between energy transmissions, the energy level is replenished for the subsequent work performing cycle.

Another object is to reduce the power consumption of sonic operations in which there are intermittent transfers of energy from the output surface of the vibrator assembly to the work piece or object.

Still another object is to reduce the power consumption of sonic operations in which there are intermittent transfers of energy from the output surface of the vibrator assembly into a liquid or gaseous medium.

A further object is to provide structures by which the amplitude of longitudinal vibration may be maintained at a sufficient level, thereby to permit the efficient utilization of such longitudinal vibrations for operations that require intermittent transfer of energy from the vibrator.

The above, and other objects, features and advantages of the invention, will be apparent in the following detailed description of illustrative embodiments which is to be read in connection with the accompanying drawings forming a part hereof, and wherein:

FIG. 1 is a schematic representation of the relationship between the component parts of a stored energy system embodying this invention and of the amplitude of vibration at various points in the system;

FIG. 2 is a view similar to that of FIG. 1, but for a stored energy system having means for increasing the amplitude of vibration at the working surface of the tool;

FIG. 3 is a graph showing the amplitudes of vibration of the tool during the work cycle;

FIG. 4 is a graph showing the quantities of energy stored within the tool during the work cycle;

FIG. 5 is a front elevational view, partly schematic and partly broken away and in section, of apparatus embodying the present invention for use in a plastic sealing operation;

FIG. 6 is a side elevational view, partly broken away and in section, of the apparatus of FIG. 5;

Figure 9:
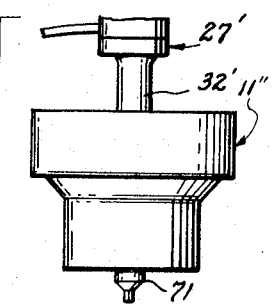
Figure 10:
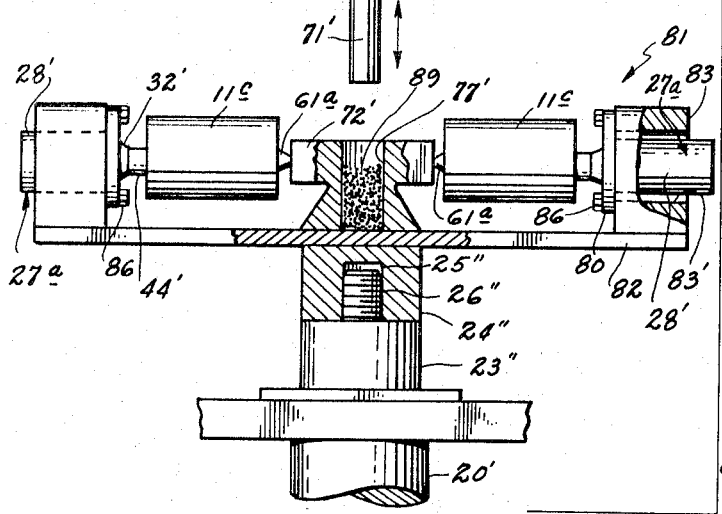

FIG. 9 is another fragmentary elevational view similar to a portion of FIG. 5, but showing another embodiment of the invention, wherein two die members are used for a metal forming operation and both die members have vibratory energy imparted thereto from a stored energy source; and FIG. 10 is a front elevational view, partly schematic and partly broken away and in section, of an apparatus constructed in accordance with still another embodiment of the invention.

Referring to the drawings in detail, wherein similar reference numerals refer to similar parts in the several views, it will be seen that FIG. 1 shows a vibratory tool 11' supported by a vibratory machine or transducer 27'.

The vibratory machine or transducer 27' may be any one of a number of electro-mechanical types, such as, electrodynamic, piezo-electric or magnetostrictive, however for purposes of discussing the present invention a transducer of the magnetostrictive type has been selected.

The transducer 27' is a vertically disposed, water-cooled magnetostrictive transducer, which is of the type disclosed in United States Letters Patent No. Re. 25,033, issued Aug. 29, 1961, to Lewis Balamuth and Arthur Kuris. The transducer as diagrammatically shown, generally includes a driver unit made up of a generator 33' of mechanical vibrations and a connecting body which may form an acoustic impedance transformer 32'. The generator 33' of mechanical vibrations may comprise a stack of laminations of magnetostrictive material, for example, nickel, and a diagrammatically illustrated winding 34' adapted to carry a biassed, high frequency, alternating energizing current. The lower ends of the laminations making up the stack of vibration generator 33' are fixedly secured, as by welding or soldering, to the upper end of the connection body 32' which has an enlarged section 35' intermediate its ends, in the general area of a nodal plane of motion, for attachment to a suitable support.

A biassed, high frequency alternating current is supplied to winding 34' from a suitable oscillation generator 31' which may be of the type disclosed at p. 270 of "Ultrasonic Engineering," by Alan E. Crawford, published 1955, by Butterworths Scientific Publications, London. An oscillation generator of this type is effective to supply a biassed alternating current to the winding 34' at a resonant frequency of the driver unit of transducer 27' and is further effective to vary the frequency of the supplied biassed, alternating current when the resonant frequency of the driver unit is varied due to changes in temperature, or changes in the loading thereof.

When transducer 27' is operated, by electrical oscillations supplied from generator 31', compressional waves are generated in the stack of laminations 33', the body 32' and transmission member or tool 11', so as to cause vibrational movements in the vertical direction, that is, along the longitudinal axis of the transducer. For the purposes of the present invention, such vibrations may have a frequency in the range between approximately 400 cycles per second and 100,000 cycles per second, preferably from 1000 to 40,000 cycles per second, and are of sizable amplitude, for example, in the range between approximately .0001 and .30 inch. In order to ensure that the maximum amplitude of vibration in the vertical direction is obtained at the lower end 61' of transmission member or tool 11', thus ensuring the maximum transmission of working energy, the overall length of the stack of magnetostrictive laminations 33' and the connecting body or transformer 32', that is, the driver unit of transducer 27', and of the vibration transmission member or tool 11' is selected so that, at the frequency of the electrical oscillations supplied to winding 34' of the transducer, a loop of longitudinal motion of the generated compressional waves occurs at or near the lower working end 61' of tool 11'. In other words, the overall length of the driver unit of transducer 27' and transmission member or tool 11' is approximately equal to an integral number of one-half wavelengths of the sound waves generated in the particular materials comprising the stack of laminations 33', the transformer 32' and the transmission member or tool 11' at the working frequency.

This invention utilizes the idea that an elastic bar, of high mechanical efficiency, or low internal damping, sustains a large stored non-dissipated elastic energy for a much smaller energy cost per cycle of vibration.

This idea is readily expressed in the equation:

$$(I) \quad Q = \frac{\text{energy stored in vibration}}{\text{energy dissipated in each cycle}}$$

where "Q" is called the mechanical "Q" of the system.

The point of immediate importance is that a resonant transducer, as described above, will undergo a relatively large amplitude of vibration with relatively high stresses and strains in the stack material, as compared with those attainable statically or with non-resonant vibration in response to a given power input from the energizing source or generator 31'. The higher the cyclic strain in the material of stack 33', the higher will be the coupling, between the electrical energy in the exciting coil 34' and the mechanical energy in the transducer stack 33', and the higher will be the power output rating per unit volume of stack material. The generation of mechanical power in a magnetostrictive transducer is directly proportional to the dynamic strain level.

For practical, high frequency mechanical processing, it is, in almost every important commercially useful case, essential to maintain the vibratory level of the transducer substantially constant during power transmission to the load. This is another way of saying that the vibratory system should be essentially non-damping or load insensitive. If proper attention is not paid to this basic fact, then the vibratory level or output amplitude of vibration of the transducer will generally fall significantly as soon as the transducer is loaded. When this happens in practice, recourse is generally had to a manual adjustment whereby the necessary power increase is supplied from the electrical oscillation generator to the transducer, for restoring or maintaining the vibratory level under load. In some cases, elaborate automatic equipment may be necessary in order to maintain the undamped level during the loading.

The applicant, being thoroughly cognizant of the difficulties in practice, has found a very simple method, whereby the aforesaid damping load is negligible even though the power input to the transducer is not substantially changed during the loading operation. In order to achieve this result in accordance with the invention, it is necessary to give careful design consideration to the several parts of the vibratory system, especially with respect to the relative masses of said parts. Such parts, as described above, generally comprise an electromechanical conversion unit consisting of the stack 33' and winding 34' energized from generator 31' and a tool 11' for conveying the vibratory energy into the work load. If the amplitude of vibratory motion required is beyond the capacity of the electromechanical conversion unit, the additional component 32', usually called a connecting body or mechanical impedance transformer, may be introduced between said conversion element and the tool.

In practice, the invention has been found to be most useful when applied to intermittent work loads. This is so because the small but finite diminution of vibratory level of the tool during the work period, that is, during loading of the transducer, is automatically restored to its original value during the rest or dwell period, or period of no loading within the total cycle of operation. The only requirement is the desirable one of maintaining the power input from the generator 31' at a constant level. In practice, this merely means that, once the generator is properly set for the vibratory system, it requires no further attention. Because of the very high "Q" materials available in tools, it requires a relatively small electromechanical conversion unit to maintain a load formed by the tool at a high energy level of storage. That is, if the tool is massive compared with the conversion unit by which electrical energy is transformed into mechanical vibratory energy, only a modest power input is needed to keep the total unloaded system vibrating at the desired working level. But, as has been indicated above, this same modest power input does not have to be changed during the loaded part of the cycle. This means that, with a suitably designed vibratory system working or performing operations intermittently, it is now possible to perform operations not previously imagined to be practically possible. Also, the new possibility is in the right direction for achieving new economies. In essence, a so-called "big job," may be performed with a small generator.

When it is appreciated that the cost of the mechanical vibratory system is usually only a fraction of the cost of the generator, it will be realized that economy in the generating means is crucial to commercialization.

One of the novel aspects of this invention is that, as the art of electromechanical conversion element design progresses, yielding elements of higher efficiency, and hence, higher, "Q," the decrease in generator size will be still further reduced. Therefore, it may be anticipated that, as this new technological field develops, the use of this invention will allow smaller and smaller generating means to be employed, thereby ever-widening the commercial scope of this field of technology.

The theory of the stored energy principle underlying this invention will now be discussed with reference to a resonant system, or one in which each component part, namely, the stack 33', transformer 32' and tool 11' are as close to the same resonant frequency as possible. In the arrangement represented on FIG. 1, no amplitude magnification is built into any of the three component parts, that is, the stack 33', transformer 32' or tool 11', so that the amplitude of vibration is equal at each loop of longitudinal motion within the system.

The distance which a point on the tool 11' will move from its nodal position increases with the distance of this point from the center. A maximum distance that this point will travel is determined by a combination of its inherent limitations which are related to the magnetostrictive material, the strain level that can be tolerated by the stack, the dissipation of heat generated therein, and the geometry of the transducer and its associated parts.

A very important matter of concern in the construction of these vibrators used to produce sound in a medium is the efficiency of conversion of the electrical driving energy into the transmitted acoustical energy. For any vibrator, this efficiency is highest at the resonant frequency. Thus, for a simple bar, one can choose a proper length for a desired frequency of operation, knowing the velocity of sound in the material used.

In order to understand the basic nature of the invention and to appreciate the role played by the relationship of the mass of the tool 11' and body 32' to the mass of the stack 33', it is important to understand the effect of the amplitude of vibration of the tool 11'.

Assuming no magnification of vibration amplitude, as in FIG. 1, it can be stated that the power required to maintain a given amplitude of vibration, A, is directly proportional to $A^2$. Therefore, an increase or decrease in A, means an increase or decrease in the power required from the generator 31' to maintain the new vibratory condition. At the same time, for the power expended to maintain the vibration, we obtain a certain amount of circulating mechanical energy stored in the transducer, connecting body and tool. The amount of this energy storage depends on the mass of tool and connecting body, if any, and the amplitude of vibration A.

The underlying energy transformations accompanying an intermittent work process have been reduced to an equation from which the specific features of this invention may be clearly seen in their broadest perspective. This general equation for the power required from a generator to sustain a motor-tool combination at a given energy storage level is as follows:

(II)

Power input to motor-tool combination =

$$\frac{fE_{tool}}{Q_{tool}}\left[1+\left(\frac{E_{stack}}{E_{tool}}\right)\left(\frac{Q_{tool}}{Q_{stack}}\right)+\left(\frac{E_{cb}}{E_{tool}}\right)\left(\frac{Q_{tool}}{Q_{cb}}\right)\right]$$

in which $E_{tool}$ = The energy storage capacity of the tool 11'.
$E_{stack}$ = The energy storage capacity of the stack 33'.
$E_{cb}$ = The energy storage capacity of the connecting body or transformer 32'.
$Q_{tool}$ = Energy absorption characteristic of tool 11'.
$Q_{stack}$ = Energy absorption characteristic of stack 33'.
$Q_{cb}$ = Energy absorption characteristic of connecting body or transformer 32'.
$f$ = Frequency of vibration.

The Q of a transducer or tool is actually a factor of merit. It is dependent upon the material and design of the specific stack, connecting body or tool used.

If the tool 11' is assumed to have a mass substantially greater than the combined mass of stack 33' and the connecting body or transformer 32', the stack and connecting body can be considered together as the motor in the following.

For most practical cases, we may take $Q_{tool}=Q_{cb}$ since the materials of each may be the same.

Now, since the energy stored in the tool is very large compared with the energy stored in the motor, we may neglect the third item in the above Formula II and arrive at a good approximation, that is, without altering the basic relative magnitudes involved. For this case then:

(III)

Power input to motor-tool combination =

$$\frac{fE_{tool}}{Q_{tool}}\left[1+\left(\frac{E_{stack}}{E_{tool}}\right)\left(\frac{Q_{tool}}{Q_{stack}}\right)\right]$$

In order to obtain some idea of the magnitudes derived from the above equation, we may select variable values for an actual system, for example, $Q_{stack}=200$ and $Q_{tool}=20,000$; and $M_{tool}=100 \times M_{stack}$.

The formula for the stored energy capacity of a half-wavelength vibrator is, as follows:

(IV)
$$E=\frac{1}{2}\left(\frac{M}{2}\right)V^2$$

where:

$E$ = The energy storage capacity of the tool 11', stack 33' or connecting body 32'.
$M$ = Mass of either of the above.
$V$ = Velocity amplitude.
$A$ = Amplitude of vibration.

V The velocity may be expressed as (V) $\qquad V=2\pi fA$

Thus, in a given system in which there is no amplitude magnification, the ratio of the energy stored in the tool 11' to that stored in the stack 33' is directly proportional to the respective masses of each and may be written, as follows:

(VI)
$$\frac{E_{stack}}{E_{tool}}=\frac{M_{stack}}{M_{tool}}$$

Then, we have (VII)

Power input to motor-tool combination $=\frac{fE_{tool}}{20,000}\left[1+\frac{1}{100}\times\frac{100}{1}\right]=\frac{fE_{tool}}{10,000}$ For practical purposes, this equation can be rewritten so that, when $f$ is in Kc./sec, $E_{tool}$ is in ft.-lbs., and power is in kw. This merely requires the insertion of a numerical factor which transforms the approximate equation into (VIII) Power input to motor-tool combination $=\frac{fE_{tool}}{7,800}$ $f$ in Kc./sec, $E_{tool}$ in ft.-lbs., power in kilowatts.

Thus, it will be seen that, in order to sustain a given amount of stored energy in the tool, less power is required at lower frequencies. The following simple Table A shows the energy stored for each kilowatt of input power at various frequencies:

Table A

| Frequency, $f$ (kc.): | Energy stored* |
|---|---|
| 20 | 365 |
| 10 | 730 |
| 5 | 1,460 |
| 3 | 2,425 |
| 1 | 7,300 |

*$E_{tool}$ ft.-lbs. per kw. input power.

If the motor and the tool have the same mass and the motor is divided equally in mass between the stack 33' and the connecting body 32', then Equation III becomes (IX) Power input (kw.) motor-tool combination $=\frac{51.5fE_{tool}}{20,000}\sim\frac{fE_{tool}}{390}$ and the energy stored in the tool per kw. of input power at various frequencies is as shown in the following Table B:

Table B

| Frequency, $f$ (kc.): | Energy stored* |
|---|---|
| 20 | 19.5 |
| 10 | 39 |
| 5 | 78 |
| 3 | 130 |
| 1 | 390 |

*$E_{tool}$ ft.-lbs. per kw. input power.

Hence, the arrangement represented by Table A stores about 20 times the amount of ft.-lbs. of energy per kilowatt of input power relative to the arrangement of Table B. Thus, when the tool is relatively of greater mass and work is done intermittently, as in the condition illustrated in FIG. 1, power is supplied continuously to the system by the oscillation generator 31′ and a relatively large quantity of energy is stored within the tool 11′ in the intervals between work periods.

Referring now to FIGS. 3 and 4, it will be seen that the time for a complete cycle is T which is subdivided into a time T1 and T2. T1 is the work period during which there is a transfer of energy into the work piece or object, and T2 is the time interval between work periods during which the energy consumed is replenished in the tool.

Under the above condition for any system, the net change in the energy stored in the motor-tool combination in the working time T1 during which there is an energy transfer from the system to the work object is:

$$\Delta E = (P_{input} - P_{work})(T1)$$

where:

$\Delta E$=Energy change during the work cycle.
$P_{input}$=The power supplied by the generator 31′.
$P_{work}$=The power consumed in the work during the work period.

The other point which must be recognized is that, in order for the tool to perform its operation efficiently, it must maintain a working stroke which is substantially constant. Now, as soon as the tool 11′ is put in contact with the work, energy will be transmitted to the work. If the power of generator 31′ remains constant, then this power will now be divided between the motor-tool combination and the work load, and, for the work period T1, the energy supplied by the generator is divided between the motor-tool and the work load. This means that the working stroke of the motor-tool combination must decrease by just the amount necessary to compensate for the energy loss to the motor-tool combination.

The whole point of this invention is that the motor-tool combination is so designed for a given work load, that the above mentioned energy change is only a small portion of the energy stored in the motor-tool and so the stroke of the motor-tool does not change materially during the work period.

In order to achieve the benefits of this invention, the transmission means, for example, the connecting body 32′ and the mass of the tool 11′, between the vibration generator 33′ and the working surface 61′ which is intermittently contacted with the work piece during each work period, should have an energy storage capacity at least five times as great as the quantity of vibratory energy transferred to the work piece during each work period. Further, the energy storage capacity of such transmission means should be at least twenty times as great as the energy storage capacity of the vibration generator, that is, of the magnetostrictive stack 33′ in the illustrated embodiment.

Referring now to FIG. 2, it will be seen that the tool 11, in an apparatus embodying this invention, may be a blade-like element of solid material, such as, aluminum, magnesium, titanium, Monel, steel, brass, beryllium, copper or a hard plastic, which is formed to act as a vibrating amplitude transformer having a certain magnification ratio. Thus, the illustrated blade 11 includes an input section 11a of relatively large thickness and mass, and an output section 11b which is thinner than the input section and of lower mass. As described in U.S. Patent No. Re. 25,033, issued Aug. 29, 1961, to Balamuth et al., for Vibratory Machine Tool and Vibratory Abrasion Method, and assigned to the present assignee, the mass differential between the input and output sections of the vibrating element increases the amplitude of the vibration appearing at the outer edge with respect to that applied to its inner edge by the transducer.

The transducer stack 33 and connecting body 32 of the vibrator unit 27 should each have a length corresponding to one-half wavelength, or integral multiples thereof, at the vibration frequency of the transducer or vibrator unit 27.

The method embodying this invention may also be used with a vibratory tool as disclosed in U.S. Patent No. 3,113,225, issued Dec. 3, 1963, to Claus Kleesattel et al., for Ultrasonic Vibration Generator, and assigned to the present assignee, as well as with any other tool which is not designed to act as an acoustical impedance transformer.

Referring again to FIG. 2, it will be seen that the blade 11 is made one-half wavelength long, and that the transition region between the input section 11a and output section 11b is situated at the quarter wave or nodal point of the blade. A suitable type of transducer structure is illustrated in U.S. Patent No. 3,113,225, identified more fully above, although other types may be used.

The basic principle involved is that the energy storage capacity of the tool 11, or of the tool and connecting body where the latter is of large mass, is always greater than the energy required during each work operation and that this energy is removed from the tool during such operation and replenished within the tool during the period between work operations. Amplitude magnification may be built into the vibratory system by the utilization of a tool 11, as in FIG. 2, or by the use of a connecting body in the form of an acoustic impedance transformer, that is, having input and output sections of different mass.

I have found it possible to store within the tool 11 an energy supply which can easily be ten times greater than $E_c$, the energy required to perform an operation, for example, the sealing of a tube. In this manner with a resonant system and a constant power input into the transducer 27 from the generator 31, it is possible, during each interval T2 between successive sealing operations, to replenish the energy $E_c$ consumed by friction, internal losses and the sealing operation occurring in the time T1 by maintaining a constant power input into the system at all times. Thus, a properly designed system may be used in a sealing or other operation with an input of power at a constant rate which is more than that needed to sustain the unloaded system, and without appreciable damping of the vibration of the tool during the work period or operation.

An intermittent process is any one in which there is a dwell time between successive work periods or operations. The application of this invention is not limited by any ratio of T1 to T2. The time T1 during which there is the transfer of a quantity of energy $E_c$ to the work piece, may be greater than the dwell time T2, during which the energy consumed in the sealing or other operation is replenished in the system.

As a prerequisite for obtaining consistent results in almost all applications of energy in the sonic or ultrasonic range, it is necessary to maintain the output end of the tool and/or connecting body at a constant amplitude A of vibration. Inconsistencies in the results obtained in cleaning, forming, forging or otherwise subjecting a work piece to a high frequency energy source, often are caused by a large fluctuation of amplitude during the work period or operation. Thus, the prime consideration in the various applications of high frequency vibratory energy is the maintaining of the amplitude of vibration within a relatively small range during the work cycle.

The applicant has found that, by the utilization of a relatively massive tool or the combination of a tool with a connecting body or transformer of large mass, and hence having a large energy storage capacity as compared to the energy required to perform the intermittent work operation, it is possible to maintain the system at a relatively constant amplitude of vibration.

In an intermittent operation, the quantity of energy released into the work piece is small as compared to the quantum of energy stored in the tool or in the tool and connecting body, so that the working stroke or amplitude of the tool is substantially unchanged during transmission of energy into the work piece.

This basic concept will now be further explained with continued reference to FIGS. 3 and 4 in which the amplitude of vibration at the output surface of the tool and the stored energy of the tool are respectively plotted as functions of time.

Curve $e$ of FIG. 4 represents the rise time $T_r$ during which energy is fed into the system from power supply 31 to increase the energy storage level in the tool. Initially, the system has an energy level of zero, designated on FIG. 4 as $E_0$. Energy is then introduced into the system at a constant rate P As shown, the amplitude of vibration A, increases at a quite rapid rate during the rise time $T_r$, designated by curve $a$ on FIG. 3, which is equal to the period of time required to cause the mass of the entire system to absorb the energy and simultaneously overcome the energy dissipated within it. The time $T_r$ will be dependent upon the inertia inherent in the transducer and tool, as well as the losses in the system. If the electrical energy input is maintained at a rate of power $P_1$, the vibration induced in the transducer and tool or blade will remain at a normal amplitude $A_n$. This level of amplitude may be maintained until the first work piece is contacted by the tool and an energy quantity designated as $E_c$ is consumed in a period time T1. The amplitude $A_n$ may be maintained for any length of time $T_d$ after the rise time $T_r$ by maintaining a constant input of power into the transducer upon attainment of the energy storage level designated as $Es$. The amplitude at this level $A_n$ is not necessarily the maximum at which the system is capable of being driven, but rather it is the amplitude recommended for the maximum life of the component parts. Thus, it is possible, in a properly designed system, preferably of a resonant design, to store energy at a level $Es$, when the energy is being introduced into the system at a rate of $P_1$. At the conclusion of the work period T1 during which vibratory energy is transferred from the tool to the work piece, the amplitude of the system has dropped to a level $A_L$ which is represented by a corresponding energy level $E_L$ in FIG. 4. The tool 11 will be in intermittent contact with either the same work object or with successive objects depending upon the process for which the equipment is being utilized. For example, in a sealing application as illustrated by FIGS. 5 and 6, as hereinafter described in detail, a new tube C is positioned for each sealing operation, whereas, in a forming or forging operation, a series of intermittent blows or contacts might be required on the same work piece prior to the completion of the operation.

Curve $a_1$ in FIG. 3 and curve $e_1$ in FIG. 4 represent the simultaneous decrease of amplitude and stored energy within the tool 11 during its contact with the work piece. During this interval of time T1, the generator 31 is constantly supplying electrical energy to the transducer at a rate equal to $P_1$.

After completion of the sealing or other operation, the tool 11 is moved out of contact with the work piece, or sealed tube, thereby to permit removal of the sealed tube and insertion of the subsequent tube to be sealed. The time required for removing the sealed tube, positioning the next one in place and contacting the next tube with the tool is designated by the time T2 on FIGS. 3 and 4. Thus, as indicated at $e_2$, the constant input of energy into the system for the preselected interval of time T2 is sufficient to replenish the stored energy previously consumed in the sealing operation. As shown, the amplitude of vibration and energy level increase during this interval of time T2 as represented by curves $a_2$ and $e_2$, respectively. The buildup results from the ability of the transducer 27 to store energy in tool 11 at a greater rate than is dissipated by internal losses due to friction heat, and the like.

The intermittent operation of sealing and replenishing the stored energy within the ssytem may be carried on indefinitely. After completion of the recharging cycle T2 indicated by curve $e_2$, the stored energy is sufficient to perform the next sealing operation during the time T3 which is equal to T1. During the period T3, the amplitude of vibration, designated at $a_3$, and the energy level, designated at $e_3$ are reduced at linear rates. At the completion of the sealing cycle, the amplitude of vibration of the output surface of tool 11 has again decreased to $A_L$. The replenishing and storing of energy within the tool 11 is accomplished during the subsequent dwell period T4, during which the energy level of the system is made to rise at a rate indicated at $e_4$ until the amount $E_c$ is stored, thereby obtaining a stored energy level equal to $Es$.

Referring now to FIGS. 5 and 6, it will be seen that the apparatus embodying this invention, as there illustrated, is for the welding or sealing of sheet materials on an intermittent basis. The material to be sealed is plastic, but it will be realized that the sheets to be joined may be of any thermoplastic material or materials, capable of coalescing to form a bond therebetween. It will also be understood, that only one of the materials need be of this character, with the other sheet, for example, being of a porous material into which a fuseable material will penetrate. However, for the purpose of the explanation of the FIGS. 5 and 6, it will be assumed that the apparatus is working with plastic sheet materials that are to be sealed intermittently and that are at rest when being joined together.

In the apparatus 10 illustrated in FIGS. 5 and 6, the tool 11 and a die member 12 are supported within a frame 13 that includes parallel uprights 14 and top and bottom cross members 15 and 16 suitably secured to the opposite ends of the uprights. Intermediate cross members 17 are secured, at their ends, to the uprights 14 at adjustably selected locations, for example, by pins 18 extending through openings in cross members 17 and through selected openings of a series of openings 19 formed in each of the uprights.

An hydraulic cylinder 20 depends vertically between intermediate cross members 17 and has a mounting plate 21 at its upper end which is secured, as by bolts 22, to the cross members 17, and a vertically movable ram 23 projects upwardly from cylinder 20 through a suitable opening in mounting plate 21.

The die member 12 is brazed, soldered, or otherwise rigidly attached to an anvil 24 having a downwardly opening tapped bore or socket 25 for receiving a threaded extension 26 of the ram 23 (FIG. 6) so that the anvil 24 carrying the die member 12 can be securely attached to the ram for movement with the latter.

The tool 11 is supported vertically above die member 12 by the vibratory unit 27, as previously described, and that further includes an enclosure or casing 28 depending from a mounting plate 29 secured, as by bolts 30, to the top cross members 15. The flange 35 of connecting body 32 is secured by bolts 36 to the casing 28, and inlet and outlet hoses 37 and 38 are connected to the casing for circulating a cooling fluid, preferably water, through the casing so as to remove heat generated in the stack 33 during operation of the transducer.

In the apparatus 10 of FIGS. 5 and 6, the frequency of the biassed alternating current supplied through conductors in a cable 39 from generator 31 to winding 34 is adjusted by means of a magnetostrictive pick-up 40 mounted on tool 11 and providing a signal or output varying with the amplitude and frequency of the vibrations and being fed back to the generator as well as actuating an amplitude meter 41. Other existing types of oscillation generators may also be employed, for example, as disclosed in U.S. Patent No. 2,872,578, in which adjustment of the frequency of the alternating current supplied by the oscillation generator is obtained through the use of a feedback signal which varies with the impedance of the transducer.

The lower or output end of connecting body or transformer 32 is preferably provided with a depending threaded projection 42 which is coupled to a similar threaded projection 43 at the upper end of the tool or vibration transmitting member 11 by means of an internally threaded coupling sleeve or nut 44. A thin disk 45 of copper or other deformable metal is preferably interposed between the smooth flat end surfaces of the projections 42 and 43 so that, when sleeve or nut 44 draws projections 42 and 43 axially toward each other, disk 45 ensures uninterrupted metallic contact between transformer 32 and tool or vibration transmitting member 11 over the substantial cross sectional area of projections 42 and 43, whereby, the transmission of vibrations from transformer 32 to tool 11 is enhanced.

For a simple overlap type of weld or seal, the plastic sheets are arranged to provide a small overlap on the anvil supported die 12. However, the device 10 is shown, merely by way of example, employed for the purpose of sealing the upper ends of thermoplastic tubes C as such tubes are intermittently advanced past the device 10 in the direction of the arrow 50. Each of the tubes C may be carried by a mandrel 51 on a carriage 52 having wheels 53 riding on guide tracks 54, with movement of each carriage being effected by a suitably driven chain 55 having the carriages 52 secured thereto at locations spaced apart by distances L.

While the tool 11 of the apparatus 10 is held stationary and has acoustical or ultrasonic vibratory energy imparted thereto by the transmission of a wave motion through the transformer 32, the die member 12 is movable vertically toward and away from tool 11 by controlling the supplying of hydraulic fluid under pressure to the cylinder 20. As shown schematically in FIG. 5, the supplying of hydraulic fluid under pressure to cylinder 20 may be effected by an arrangement including a pump 62 having an inlet conduit 63 drawing hydraulic fluid from a supply tank 64 and an outlet conduit 65 extending from the pump to a distributor valve 66 which is suitably operated, for example, by a handle 67. The valve 66 is selectively operative to direct the fluid under pressure to one or the other of two flexible conduits 68 and 69 connected to the opposite ends of cylinder 20, while the other of such flexible conduits is placed in communication with a return pipe 70 extending from distributor valve 66 back to tank 64. Thus, in one position of the distributor valve 66, hydraulic fluid under pressure is supplied through conduit 68 to the upper end of cylinder 20 to move ram 23 downwardly, and thereby space die member 12 from tool 11 so that a tube C to be sealed can be inserted between the die members or so that the sealed tube can be removed. In the other position of valve 66, flexible conduit 68 is connected to the return pipe 70, while conduit 69 is connected to the outlet 65 of pump 62 and conveys hydraulic fluid under pressure to the lower end of cylinder 20 for urging the anvil supported die member 12 upwardly toward the cooperating tool 11 which is simultaneously vibrated, as previously indicated, as that the end of tube C disposed between the tool 11 and member 12 will be suitably sealed, formed or shaped by the combined action of the static force from the hydraulic fluid under pressure within cylinder 20, and of the vibrations imparted to tool 11 and represented by the arrows 46.

Relating the operation of the apparatus 10 of FIG. 5 and 6 to the cycles indicated on FIGS. 3 and 4, it will be seen that the chain 55 is held at rest with a carriage 51 disposed to position its tube C between tool 11 and raised die member 12 during each work period T1, T3 etc., and that, during each of the dwell periods T2, T4, etc., the ram 23 of cylinder 20 is lowered, the chain is moved through the distance L, and the ram 23 is again raised, thereby to position another tube at the work station. Thus, apparatus 10 works intermittently, and therefore is suited for incorporation of the present invention.

Figure 7:
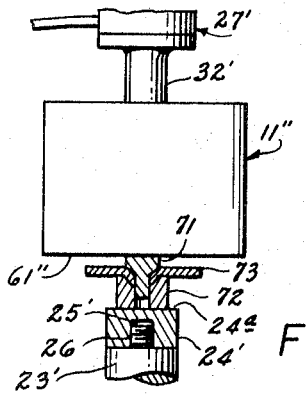
FIG. 7 is a fragmentary view similar to a portion of FIG. 5, but showing a modification of the tool and anvil die members for use in a metal forming operation.
Figure 8:
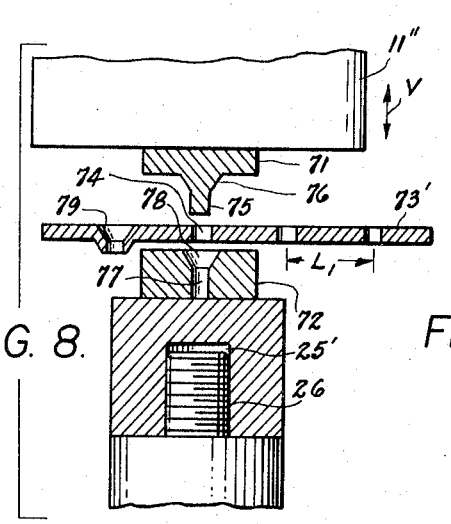
FIG. 8 is a view similar to FIG. 7, with the die members being spaced apart preparatory to the forming of sheet metal therebetween.

In another embodiment of this invention illustrated in FIGS. 7 and 8, the stored energy principle is utilized in a metalworking process for dimpling sheet metal 73 around a hole 74 (FIG. 7) formed therein so as to receive the countersunk head of a rivet or other fastening and provide a flush surface. In order to effect the above operation, a male die member 71 is brazed, soldered or otherwise secured to the output surface 61″ of tool 11″ and a cooperating female die member 72 is brazed, soldered or otherwise secured to the upper surface 24a of anvil 24′. Die member 71 has a pin 75 projecting axially therefrom to pass slidably through the hole 74 of the metal sheet 73 and a flaring or frusto-conical portion 76 is formed at the base of pin 75 and corresponds to the shape of the dimple to be formed around the hole 74 (FIG. 8). The cooperating female die member 72 has a bore 77 intended to slidably receive the pin 75 below the metal sheet 73 and opening, at its upper end, into a countersink 78 for receiving the desired dimple.

Thus, when female die member 72 is urged toward male die member 71 by the ram 23′ while male die member 71 is vibrated, as represented by the arrows V, the sheet 73 therebetween is formed with a dimple 79 around the opening 74 therein (FIG. 7). It has been found that, by reason of the vibratory energy imparted to die member 11, the desired dimple can be suitably formed by the exertion of a smaller static force than that required when the dimple is formed merely by the exertion of a static force, and that the grain structure of the metal sheet in the area of the dimple 79 is more desirable in the case of the forming of the metal by the combined action of the static force and vibrations.

Each dimple 79 may be formed on a separate piece of sheetmetal or, as illustrated in FIG. 8, the strip 73 may contain a series of holes 74 to be dimpled. The distance $L_1$ between the holes 74 is related to the time required between dimpling operations to position the next hole in line with pin 75 of die member 71. This period of time is the dwell time and is selected to enable the replenishment of the energy consumed in the dimple operation and internal losses due to friction in the tool 11″ itself, during said operation. By the utilization of this massive vibratory tool, it is possible to use a generator and transducer having a considerably lower power output thereby resulting in a more economical method for the utilization of vibratory energy.

Although the above described embodiments of the invention have imparted vibratory energy from a stored energy source to only one of the members for performing the sealing, forming or forging operation, it is contemplated that, in each case, both of the die members may be made to vibrate from a stored energy source. Accordingly, as illustrated in FIG. 9, the ram 23′ of the hydraulic cylinder 20 may carry a vibratory unit 27″ which is similar to the previously described vibratory unit 27′ and which includes an acoustic impedance transformer 31″ having a tool holder 11‴ rigidly attached thereto and carrying the female die member 72 so that, while die member 71 is vibrated by operation of the vibratory unit 27′, the other die member 72 is simultaneously vibrated by operation of the vibratory unit 27″.

In the arrangement of FIG. 9, both of the die members 71 and 72 may be simultaneously vibrated either in phase with each other or with the respective vibrations being varying degrees out of phase with respect to each other, either at the same frequency or at different frequencies effective to produce beats, and at the same amplitude or at different amplitudes, while such die members are forcibly urged together in order to effect the efficient forming of metal disposed therebetween.

The presses of FIGS. 7, 8 and 9 are merely illustrative of the fact that the energy storage method embodying this invention may be utilized in metal working equipment normally requiring large static forces to form the work piece or object to its desired shape. This method may also be used in connection with presses of the type in which a flywheel is provided to drive a die member in place of one or more hydraulically operated pistons. Further, the method embodying the invention can be employed in an arrangement in which the male or female die member is subjected to a low order of vibration, for example, 60 cycles per second, while the same or cooperative die member is simultaneously vibrated in the range of 400 to 100,000 cycles per second.

In the above described embodiments of the invention, the vibratory energy has been supplied from a stored energy source in a manner to cause either or both of the male and the female dies to vibrate longitudinally. However, in accordance with this invention, as shown on FIG. 10, the vibrations may be applied from the stored energy source so as to effect radial vibration of a female die 72′ while the male die 71′ is vibrated longitudinally in order to further reduce the static load required in the metal working operation. When the die 72′ is of annular configuration, the vibrations are applied radially thereto, so that, during each vibrational cycle, the cross-section of bore 77′ is expanded and contracted.

Although the radial motion of die 72′ may be obtained with only one transducer, the energy storage capacity of the system may be increased by the utilization of two transducers 27a to radially vibrate the female die 72′ as in FIG. 10. The method embodying this invention may also be utilized when it is only necessary to effect radial vibration within female die 72′, while the male die 71′ is either of the non-vibratory type or made to reciprocate at a low frequency of the order of 60 cycles per second. The use of this stored energy principle may be applied to numerous metal-working operations and is in no way limited to the specific illustrative embodiments shown in this application.

Referring further to FIG. 10, it will be seen that the apparatus there illustrated is used for moulding of parts from powdered metals. The powdered metal is placed in the mould or die 72′ and then subjected to pressure and vibratory energy.

Each of the pair of horizontally acting transducers 27a is similar to the transducer 27 and includes an acoustic impedance transformer 32′ coupled, as by a sleeve or nut 44′, to a relatively massive vibration transmitting member 11c.

To properly support the female die 72′ and the accompanying transducers 27a, there is provided a mounting assembly 81 comprised of a base plate 82 with upstanding support members 83 secured thereto as by welding or by some other means. The entire assembly is mounted and rigidly secured to an anvil 24″ having a downwardly opening tapped bore or socket 25″ for receiving a threaded extension 26″ of the ram 23 so that the anvil 24″ carrying the mounting assembly 81 can be securely attached to the ram for movement with the latter.

The upstanding support members 83 are provided with annular clearance holes 83′ to accommodate the transducers 27a. The enclosure or casing 28′ of each transducer 27a may have a mounting plate 80 extending radially therefrom and being secured to its upstanding support member 83, as by bolts 86.

It will be apparent that, after the female die 72′ is fixedly secured to the base plate 82, the transducers are disposed in the mounting assembly 81 so that the transfer of the stored vibratory energy from the transmitting members 11c to die 72′ may be accomplished by mere contact of the output surfaces 61a of members 11c with the peripheral surface of female die 72′. Alternatively, the output surfaces 61a may be rigidly secured to the peripheral surface of female die 72′ by brazing, welding or some other means. When transducers 27a are thus positioned, their longitudinal axes extend radially with respect to the annular female die 72′ to introduce vibratory energy radially into the latter upon energization of transducers 27a with electrical oscillations supplied thereto. The power supply means may be combined with an amplitude monitoring device, as in FIG. 5, to automatically control the amplitude of vibration of the vibration transmitting members 11c.

The above described assembly may be used for any of several metalworking operations. As indicated in FIG. 10, if the cavity 77′ of the female die 72′ is filled with a powdered substance 89 and the male die member 71′ is made to enter the cavity, for example, by raising the assembly 81 through the use of the hydraulic cylinder 20′, the male die 71′ contacts the metal powder and the vibratory energy stored in the massive tool or transmitting member 11d is transmitted to the metal powder. In this manner, it is possible to utilize the stored energy within the masses 11c and 11d to simultaneously effect radial vibration of the female die 72′ and longitudinal vibration of the male die member 71′ for compacting the metal particles to form a homogeneous article, as in U.S. Patent No. 2,815,535, issued Dec. 10, 1957 to A. G. Bodine, Jr.

The apparatus of FIG. 10 may be utilized for a broaching operation by replacing the member 71′ secured to the lower surface of the massive stored energy member 11d with a broaching tool, and by replacing the female die 72′ with the part to be broached, such part being fixedly secured to the base plate 83 in any conventional way. The part to be broached is either raised and lowered by use of hydraulic cylinder 20′, as previously described, or the entire vibratory assembly 10′ may be raised and lowered during the broaching operation. It is to be understood that the broaching operation is performed on an intermittent basis, that is, raising and lowering of assembly 10′ causes the broaching tool to contact the part for a predetermined work period, and in the intervals between successive work periods, when the broaching tool is not in contact with the work piece or part, the energy dissipated is restored within the massive tool or transmission member 11d.

Other applications for the apparatus illustrated in FIG. 10 are the dimpling, forming and deep-drawing of metal parts. To accomplish this, a work piece is interposed between the male die member 71′ and the female die member 72′. Relative vertical movement of the male die member 71′ and the female die member 72′ causes the male die to be forcibly inserted within the bore 77′ of the female die member so that the work piece is forced into a particular configuration depending upon the size and shape of the mating male and female die members. It has been found that the utilization of the stored energy in any of the above described processes makes it possible to obtain desired results that heretofore have not been practical with conventional ultrasonic or non-ultrasonic equipment.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What is claimed is:
1. In a device for intermittently applying vibratory energy to a work object, the combination of:
(A) continuously operated, electrically energized generating means producing mechanical vibrations at a frequency of at least 400 cycles per second;
(B) means defining a tool output surface for intermittent, energy transferring contact with the work object during work periods of finite duration with intervals therebetween when said surface is out of contact with the work object; and

(C) transmission means continuously transmitting said vibrations from said generating means to said tool output surface,
  (1) said transmission means having an energy storage capacity at least twenty times as large as the energy storage capacity of said generating means, and at least five times as large as the quantity of vibratory energy transferred to the work object during each work period.

2. In a device for intermittently applying vibratory energy to a work object, the combination as in claim 1: further comprising means supporting said means defining said tool output surface for movement relative to the work object.

3. In a device for the storage of acoustic energy and the intermittent transfer thereof, the combination comprising:
  (A) a power supply source of electrical oscillations;
  (B) at least one electromechanical transducer energized by said source for converting electrical oscillations to compressional waves at a predetermined frequency;
  (C) a tool to be vibrated;
  (D) means coupling said transducer to said tool for delivery of elastic vibrations thereto; and
  (E) said tool having a mass that is relatively larger than the mass of the electromechanical transducer, the ratio of said masses being sufficient to provide a substantial reservoir of circulating elastic energy for the storage of energy within the tool.

4. In a device for the storage of acoustic energy and the intermittent transfer thereof, the combination as in claim 3:
  (A) wherein said means coupling the transducer to the tool includes an acoustic impedance transformer, one end of said transformer being fixedly secured to said transducer and said tool being fixedly secured to the other end of said transformer.

5. In a device for the storage of acoustic energy and the intermittent transfer thereof, the combination as in claim 3:
  (A) wherein said transducer includes a laminated body of magnetostrictive material having a predetermined cross-sectional area and a winding coupled thereto and adapted to carry high frequency biased alternating current from said power supply source, said transducer being shaped so that a standing wave of compressional vibrations at said frequency and with an antinode at each end is set up therein when said winding is energized by the biassed alternating current; and
  (B) wherein said tool is composed of a substantially solid block of vibration supporting material having an input surface and an output surface longitudinally displaced from said input surface by a distance equal to an integral number of half-wavelengths at the said frequency of the vibrations in said material, said input surface having an area which is large compared with said cross-sectional area of the body of said transducer.

6. In a device for the storage of acoustic energy and the intermittent transfer thereof, the combination as in claim 3:
  (A) wherein the energy supplied per cycle of vibration by said power supply source to said transducer is small as compared to the elastic energy storage capacity of said tool.

7. In a device for the storage of acoustic energy and the intermittent transfer thereof, the combination as in claim 3:
  (A) wherein one of the modes of natural vibration of said tool has a frequency equal to said predetermined frequency of said transducer; and
  (B) wherein said tool has, in its vibratory mass, a structure substantially larger and more massive than that of said electromechanical transducer, the proportions of said structure being such as to provide a substantial reservoir of circulating elastic energy in said natural mode of vibration of said tool.

8. In a device for the storage of acoustic energy and the intermittent transfer thereof, the combination as in claim 5:
  wherein the mass of the tool is varied between said input and output surfaces to provide acoustic impedance transformation.

9. In a device for the storage of acoustic energy and the intermittent transfer thereof, the combination as in claim 5:
  wherein said tool is in the form of an elongated blade.

10. In a device for the storage of acoustic energy and the intermittent transfer thereof, the combination comprising:
  (A) a power supply source of electrical oscillations;
  (B) at least one electromechanical transducer for converting electrical oscillations from said source to compressional waves and adapted to vibrate when energized at a predetermined frequency;
  (C) a tool to be vibrated;
  (D) means coupling said transducer to said tool for delivery of compressional vibrations thereto when said transducer is vibrating;
  (E) said tool having a mass relatively larger than the mass of the electromechanical transducer, the ratio of said masses being sufficient to provide a substantial reservoir of circulating elastic energy for the storage of energy within the tool; and
  (F) means for intermittently transferring a portion of the stored energy within said tool to a work object.

11. In a device for the storage of acoustic energy and the intermittent transfer thereof, the combination comprising:
  (A) a power supply source of electrical oscillations;
  (B) at least one electromechanical transducer for converting electrical oscillations from said source to compressional waves and adapted to vibrate when energized at a predetermined frequency;
  (C) a tool to be vibrated;
  (D) means coupling said transducer to said tool for delivery of compressional vibrations thereto when said transducer is vibrating;
  (E) said tool having a mass relatively larger than the mass of the electromechanical transducer, the ratio of said masses being sufficient to provide a substantial reservoir of circulating elastic energy for the storage of energy within the tool;
  (F) means for intermittently transferring a portion of the stored energy within said tool to a work object; and
  (G) means for exerting a static force urging said tool against the work object during the transfer of stored energy to the latter.

12. In a device for the storage of acoustic energy and the intermittent transfer thereof, the combination comprising:
  (A) a power supply source of electrical oscillations;
  (B) at least one electromechanical transducer for converting electrical oscilations from said source to compressional waves, said transducer having an output surface adapted to vibrate when energized at a predetermined frequency;
  (C) a tool to be vibrated having a resonant frequency of vibration corresponding to said predetermined frequency of said transducer; and
  (D) means coupling said transducer to said tool for delivery of elastic vibrations thereto;
  (E) said tool having an energy storage capacity at the said resonant frequency which is substantially larger than the energy storage capacity of said transducer.

13. In the method of intermittently applying to a work object vibratory energy produced by an electrically energized generator of mechanical vibrations at a frequency of at least 400 cycles per second, the improvement comprising transmitting said vibrations from said generator through relatively massive transmmission means to an output surface which is intermittently disposed in vibratory energy transferring relation with the work object for predetermined work periods during each of which said work object receives a quantity of vibratory energy at a rate greater than that at which vibratory energy is supplied by said generator, said transmission means having an elastic energy storage capacity which is at least twenty times as large as the energy storage capacity of said generator and at least five times as large as said quantity of vibratory energy received by the work object during each work period, and operating said generator continuously to supply said vibratory energy at a rate in excess of that required to sustain vibrations of said transmission means and output surface at said frequency during the intervals between said work periods so that vibratory energy is stored in said transmission means during each of said intervals, the duration of each of said intervals being sufficient to permit substantial replenishment in said transmission means of the stored vibratory energy drawn therefrom during a prior work period.

References Cited

UNITED STATES PATENTS

| | | | |
|---|---|---|---|
| 2,893,692 | 7/1959 | Marx | 318—118 |
| 2,946,119 | 7/1960 | Jones et al. | 29—470 |
| 3,056,192 | 10/1962 | Jones | 228—1 |
| 3,201,967 | 8/1965 | Balamuth et al. | 72—430 |

OTHER REFERENCES

James Peacock: Forming Goes Ultrasonic, In American Machinst, vol. 105, No. 24, pp. 83–85, Nov. 27, 1961.

Bertwin Langenecker: Ultrasonics, An Aid to Metal Forming Metal Process, April 1964, pp. 97–99.

JOHN F. CAMPBELL, *Primary Examiner.*

M. L. FAIGUS, *Assistant Examiner.*